(12) United States Patent
Peterson et al.

(10) Patent No.: US 8,167,067 B2
(45) Date of Patent: May 1, 2012

(54) AGRICULTURAL VEHICLE EMISSION AFTERTREATMENT DEVICE UTILIZING HEAT EXCHANGER VENTILATION

(75) Inventors: Joshua A. Peterson, Jackson, MN (US); Shawn M. Entriken, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 475 days.

(21) Appl. No.: 12/504,521

(22) Filed: Jul. 16, 2009

(65) Prior Publication Data

US 2011/0011665 A1  Jan. 20, 2011

(51) Int. Cl.
*B60K 11/04* (2006.01)
*B60K 13/00* (2006.01)
*B60K 13/04* (2006.01)

(52) U.S. Cl. ...................................... 180/68.2
(58) Field of Classification Search .............. 180/68.1, 180/68.2, 68.4, 68.6, 309, 296
See application file for complete search history.

(56) References Cited

U.S. PATENT DOCUMENTS

| | | | |
|---|---|---|---|
| 3,897,847 A * | 8/1975 | Knutson ................ | 180/68.4 |
| 4,492,282 A * | 1/1985 | Appelblatt et al. ........ | 180/68.1 |
| 4,505,348 A * | 3/1985 | Gadefelt et al. ......... | 180/89.14 |
| 4,506,749 A * | 3/1985 | Sieren .................... | 180/69.2 |
| 4,854,278 A * | 8/1989 | Honecker ............... | 123/198 E |
| 5,207,187 A * | 5/1993 | Kurohara et al. ......... | 123/41.7 |
| 5,228,530 A * | 7/1993 | Tsuchihashi ............ | 180/68.4 |
| 5,575,349 A * | 11/1996 | Ikeda et al. ............. | 180/68.1 |
| 6,427,798 B1 * | 8/2002 | Imashige ............... | 180/309 |
| 6,655,486 B2 * | 12/2003 | Oshikawa et al. ........ | 180/68.1 |
| 6,880,656 B2 * | 4/2005 | Pfusterschmid et al. .... | 180/68.4 |
| 6,907,854 B2 | 6/2005 | Wikner | |
| 7,051,786 B2 * | 5/2006 | Vuk ..................... | 165/41 |
| 7,096,987 B2 * | 8/2006 | Moen et al. ............. | 180/69.2 |
| 7,128,178 B1 | 10/2006 | Heinle et al. | |
| 7,204,329 B2 * | 4/2007 | Pfohl et al. ............. | 180/68.3 |
| 2010/0006361 A1 * | 1/2010 | Vandike et al. .......... | 180/68.1 |

FOREIGN PATENT DOCUMENTS

| | | |
|---|---|---|
| EP | 0952024 | 10/1999 |
| GB | 2336662 | 10/1999 |

\* cited by examiner

Primary Examiner — John R Olszewski

(57) ABSTRACT

A self-propelled low-emission off-road vehicle has an internal combustion engine supported in an engine compartment and also includes a vehicle cooling assembly and an engine exhaust treatment device positioned in the compartment. The vehicle cooling assembly includes a powered fan and an enclosure with a heat exchanger operable to discharge heat produced by the vehicle. The enclosure presents an inlet, outlet, and air flow plenum, with the fan directing air flow along a path between the inlet and outlet. The exhaust treatment device is operable to treat engine exhaust flow. The exhaust treatment device is positioned at least partly in the air flow plenum and in the path between the inlet and outlet.

19 Claims, 8 Drawing Sheets

AGRICULTURAL VEHICLE EMISSION AFTERTREATMENT DEVICE UTILIZING HEAT EXCHANGER VENTILATION

BACKGROUND

1. Field

The present invention relates generally to off-road vehicles. More specifically, embodiments of the present invention concern a self-propelled off-road vehicle that includes an exhaust treatment device.

2. Discussion of Prior Art

Newly manufactured off-road vehicles that include a diesel engine and are self-propelled, such as an agricultural tractor, are subject to federal emissions regulations promulgated by the EPA. The original regulations, referred to as "Tier 1" standards, applicable to off-road vehicles were introduced in 1996. However, recent regulations, referred to as "Tier 4" standards, are more stringent than Tier 1 standards and are being phased into effect from 2011 to 2015. An exhaust aftertreatment device (EAD), such as a diesel particulate filter (DPF) or selective catalytic reduction (SCR) device, are known in the art and are configured to reduce diesel exhaust emissions for complying with EPA off-road Tier 4 emission standards.

Prior art off-road vehicles that include an EAD are known to suffer from various limitations. For instance, prior art EADs and control mechanisms associated with EADs are prone to unexpected and premature failure. Furthermore, conventional off-road vehicles include EADs that readily collect foreign matter or debris. Because these surfaces experience elevated temperatures from exposure to high-temperature exhaust, these high-temperature surfaces may cause combustion of collected debris.

SUMMARY

Embodiments of the present invention provide an off-road vehicle with an exhaust treatment device that does not suffer from the problems and limitations of the prior art vehicles set forth above.

One aspect of the present invention concerns a self-propelled low-emission off-road vehicle having an engine compartment in which an internal combustion engine operable to propel the vehicle is located. The off-road vehicle broadly includes a vehicle cooling assembly and an engine exhaust assembly. The vehicle cooling assembly is positioned within the engine compartment and includes an enclosure and a powered fan operable to vent the enclosure, with the enclosure and fan configured so that the engine is positioned outside of the enclosure. The enclosure includes opposite spaced apart fore and aft margins, spaced apart side margins, and spaced apart top and bottom margins extending in a fore-and-aft direction between the fore and aft margins. The enclosure presents an air inlet and an air outlet located along respective margins, and an air flow plenum enclosed by the margins, with the inlet and outlet permitting fluid communication between the air flow plenum and ambient. The powered fan is positioned in the inlet or outlet and is operable to direct a stream of air along a path between the inlet and outlet. The enclosure includes a heat exchanger operable to discharge heat produced by the vehicle. The heat exchanger at least partly defines one or more of the margins and presents a second one of the inlet and outlet. The engine exhaust assembly is operable to carry engine exhaust gas from the engine to ambient. The engine exhaust assembly includes an exhaust treatment device that receives engine exhaust gas and discharges treated exhaust gas. The exhaust treatment device is positioned at least partly in the air flow plenum and is positioned fluidly in the path between the inlet and outlet, with the air stream flowing along the exhaust treatment device to remove heat therefrom.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 2:
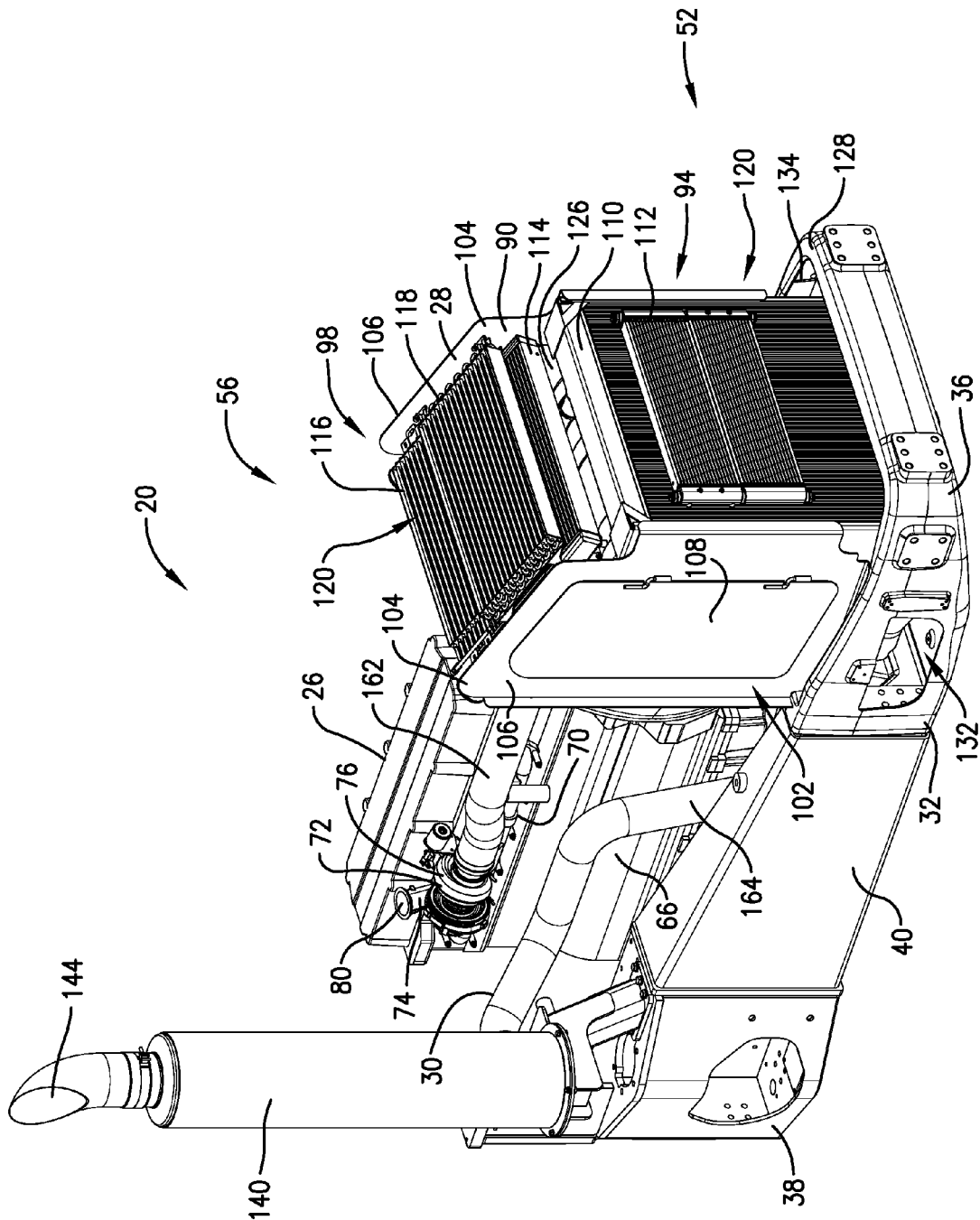
FIG. 2 is a fragmentary right front perspective of the agricultural off-road tractor shown in FIG. 1, showing a front-end assembly that includes the frame, engine, vehicle cooling assembly, and engine exhaust assembly, with the engine, vehicle cooling assembly, and engine exhaust assembly all mounted on the frame.
Figure 3:
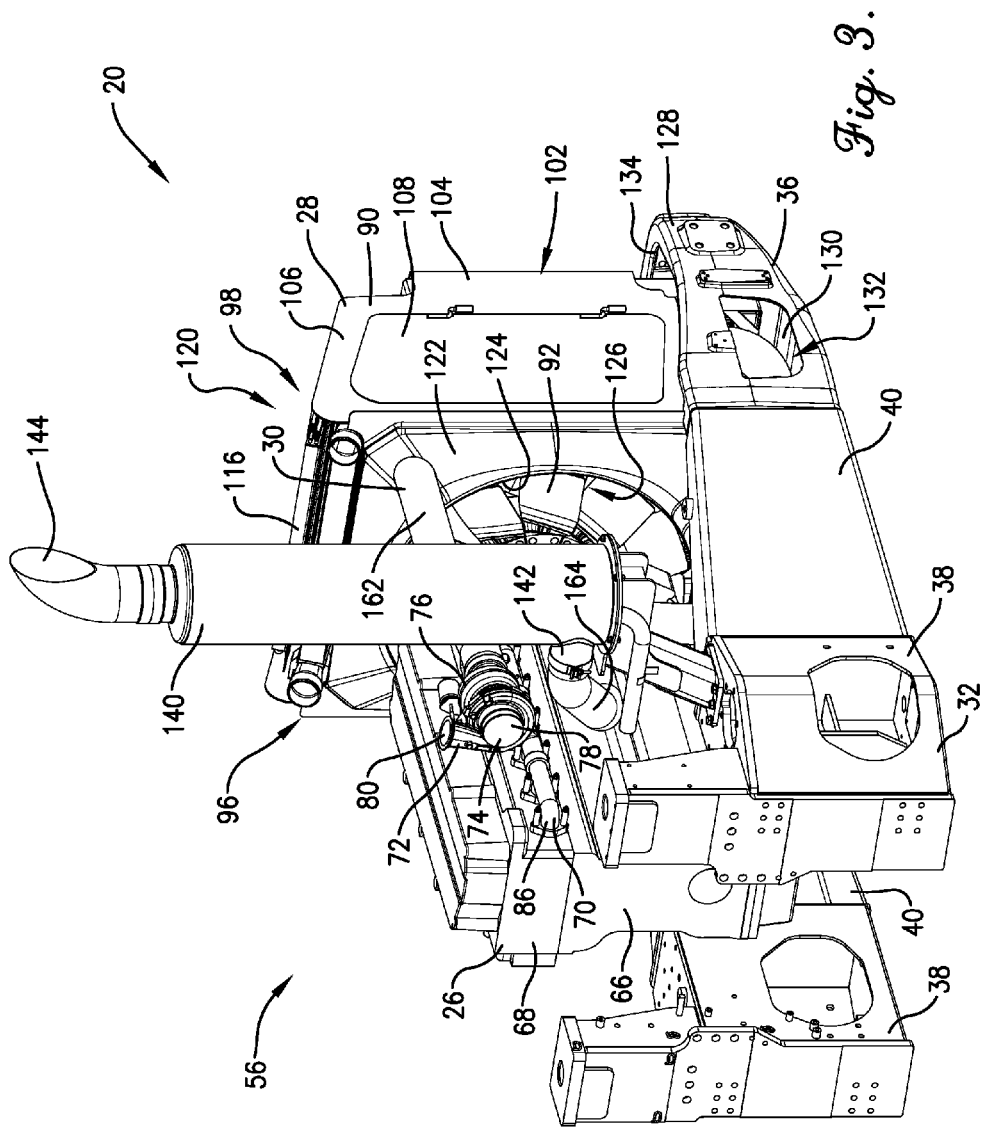
FIG. 3 is a right rear perspective of the front-end assembly shown in FIG. 2.
Figure 4:
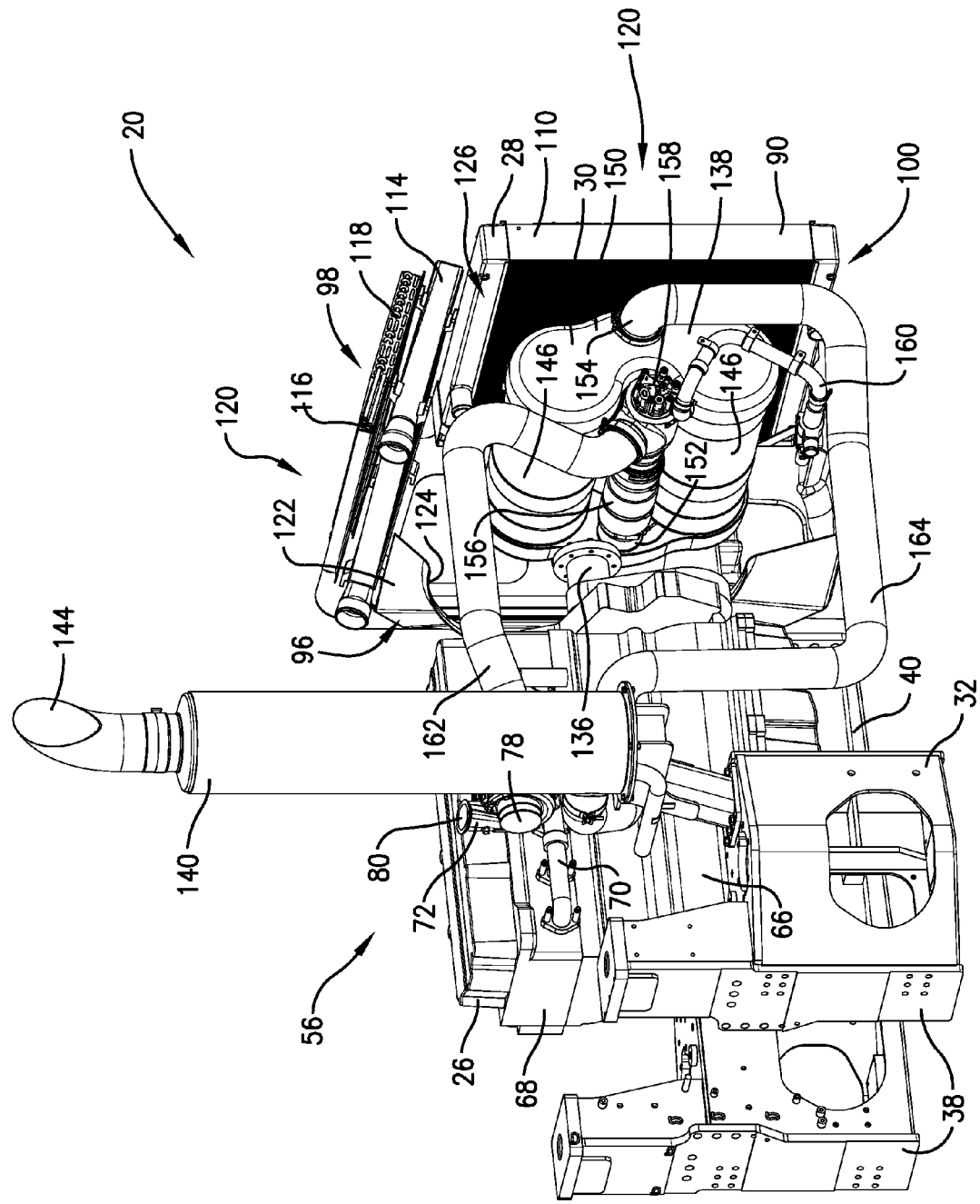
FIG. 4 is a fragmentary right rear perspective of the front-end assembly shown in FIGS. 2-3, showing part of an enclosure of the vehicle cooling assembly removed to show an exhaust treatment device of the engine exhaust assembly, with the exhaust treatment device positioned in an air flow plenum presented by the enclosure and spaced between a radiator and a powered fan of the cooling assembly.
Figure 5:
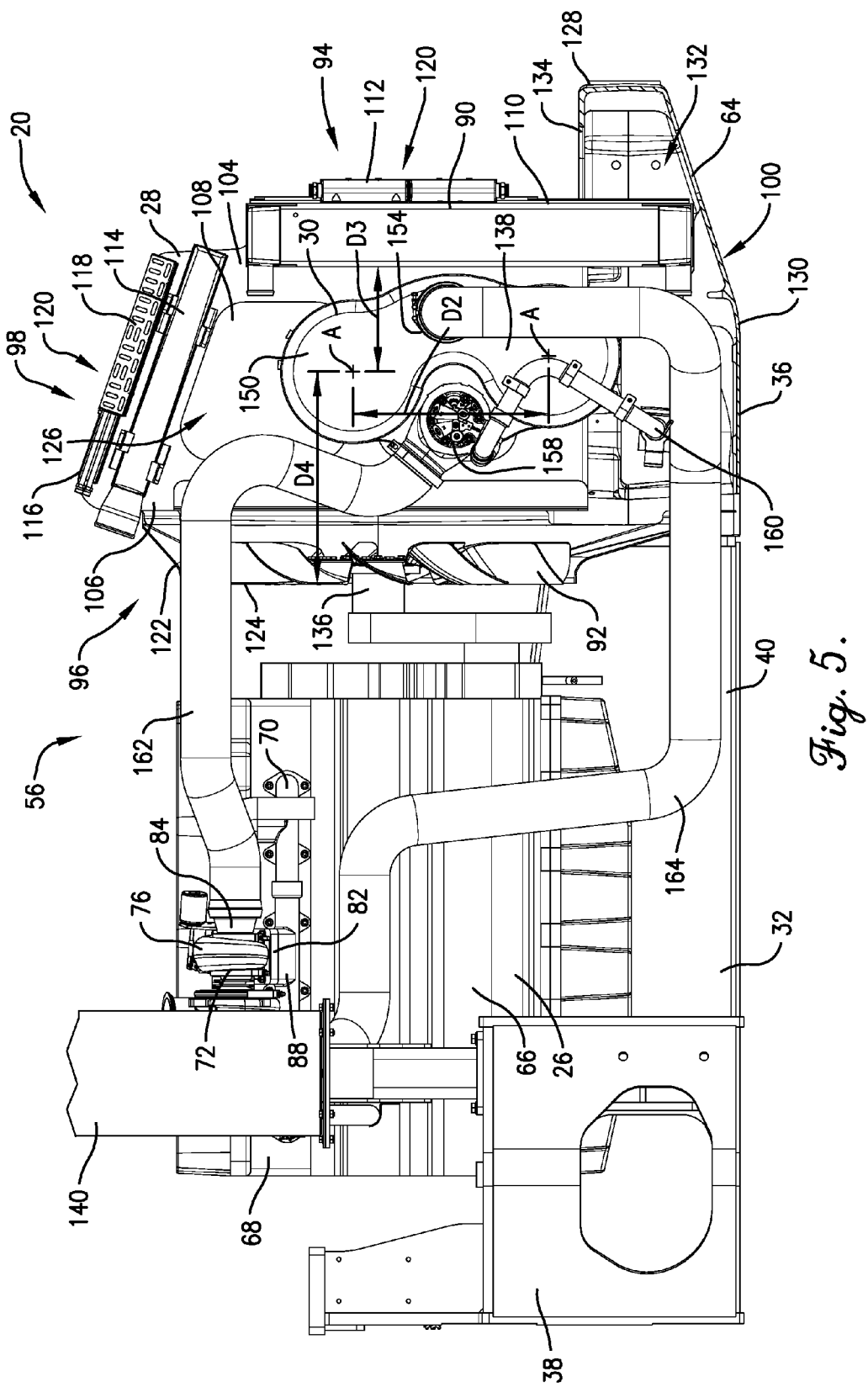
Figure 6:
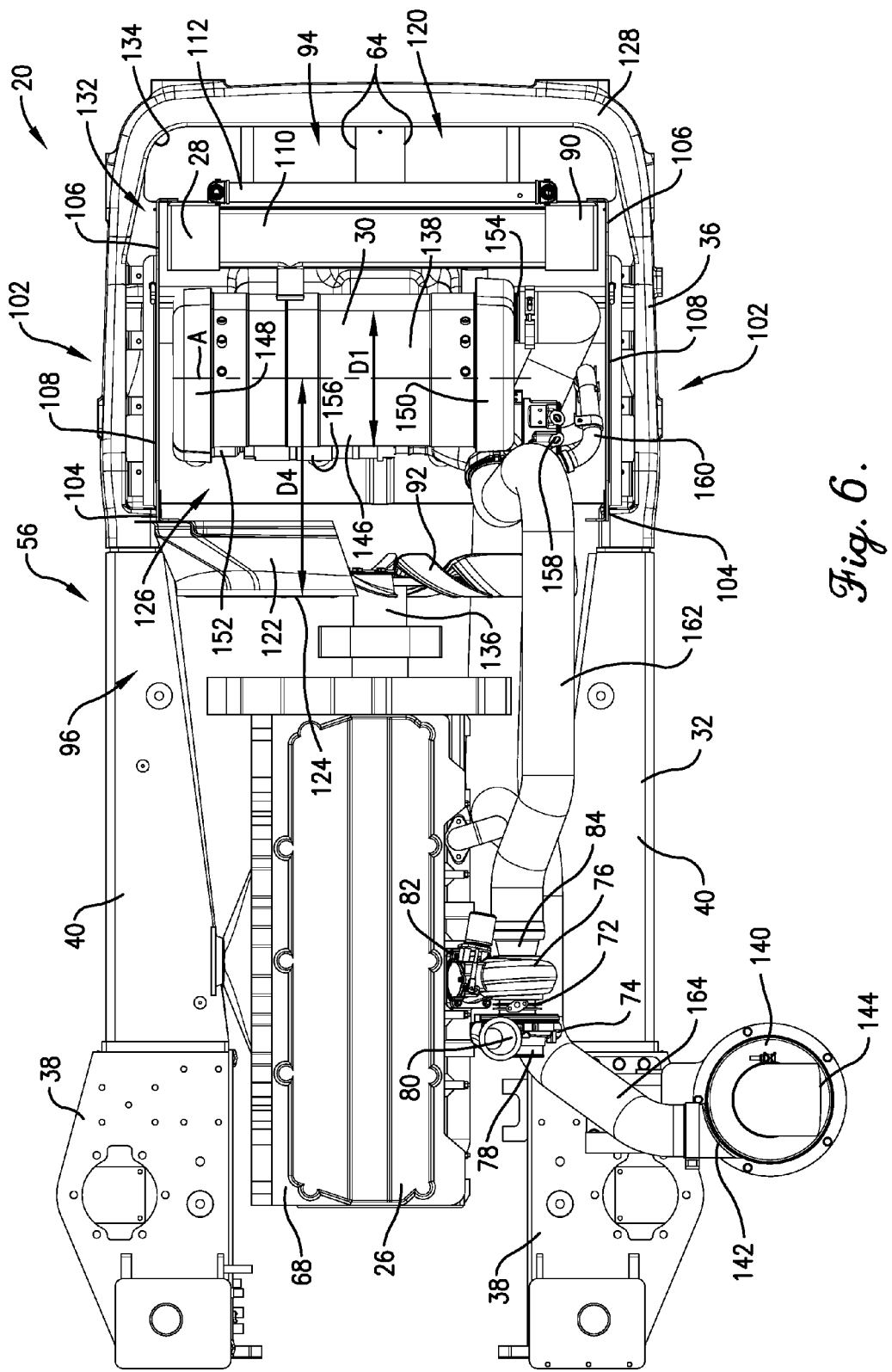
Figure 7:
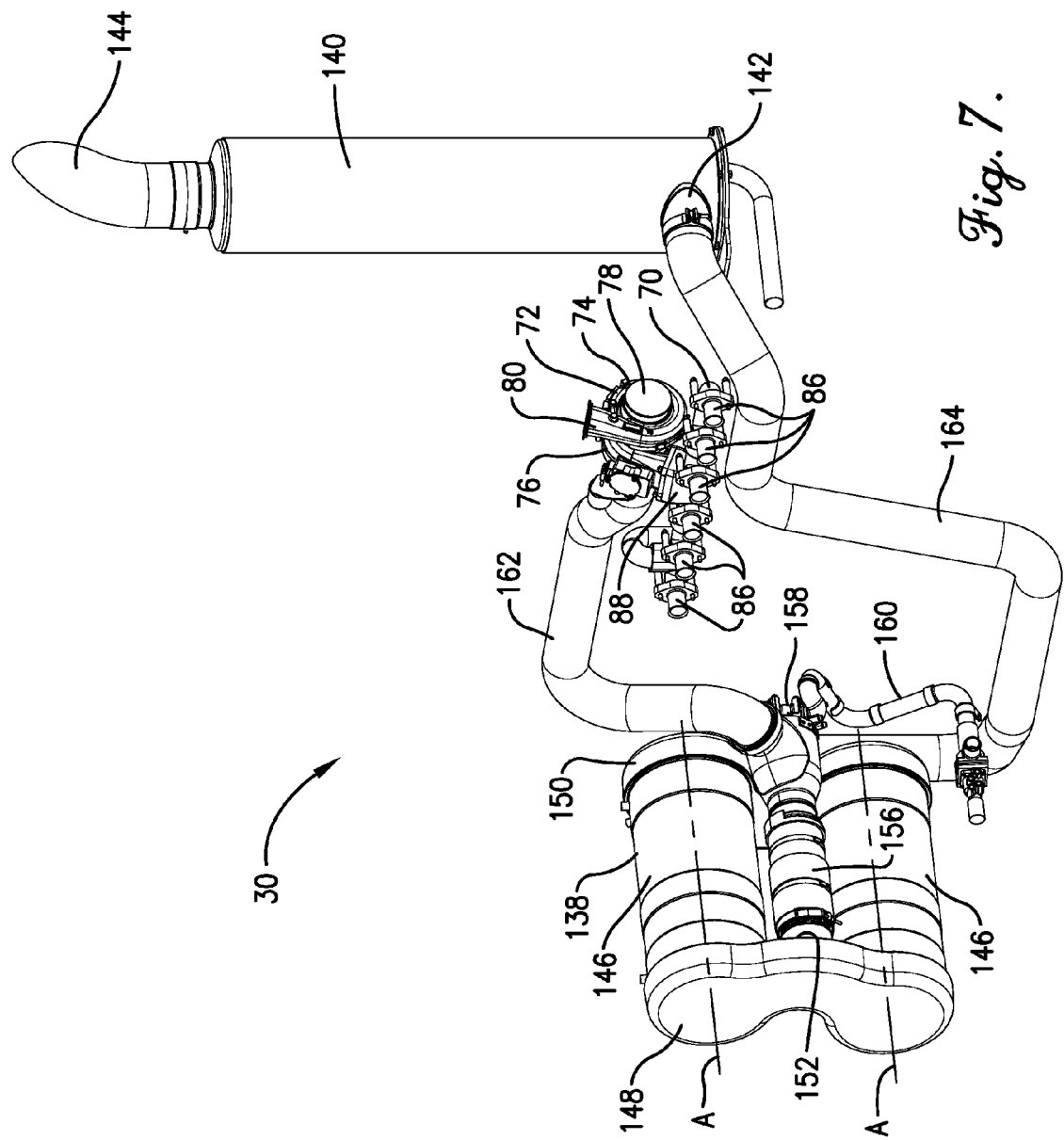
Figure 8:
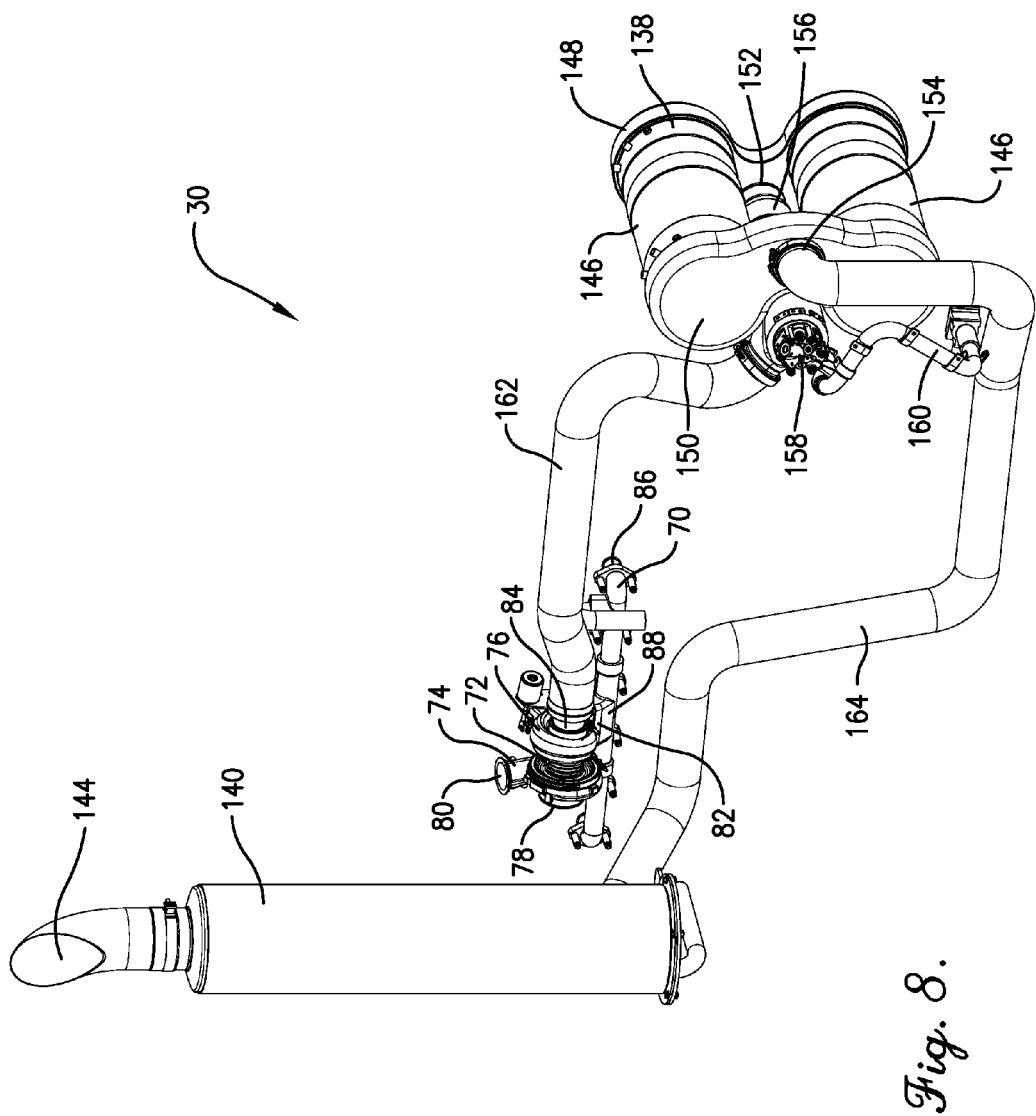

FIG. 5 is a fragmentary side elevation of the front-end assembly shown in FIGS. 2-4, showing part of the enclosure removed to show vertical and fore-and-aft spacing of the exhaust treatment device within the air flow plenum, and also showing one exhaust line running from a turbocharger of the engine to an inlet of the exhaust treatment device, with another exhaust line running from an outlet of the exhaust treatment device to an exhaust muffler;

FIG. 6 is a fragmentary top view of the front-end assembly shown in FIGS. 2-5, showing part of the enclosure removed to show lateral and fore-and-aft spacing of the exhaust treatment device within the air flow plenum;

FIG. 7 is a fragmentary left rear perspective of the front-end assembly shown in FIGS. 2-6, showing the engine exhaust assembly with the frame, engine, and vehicle cooling assembly removed; and FIG. 8 is a fragmentary front right perspective of the front-end assembly shown in FIGS. 2-7, showing the engine exhaust assembly with the frame, engine, and vehicle cooling assembly removed.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
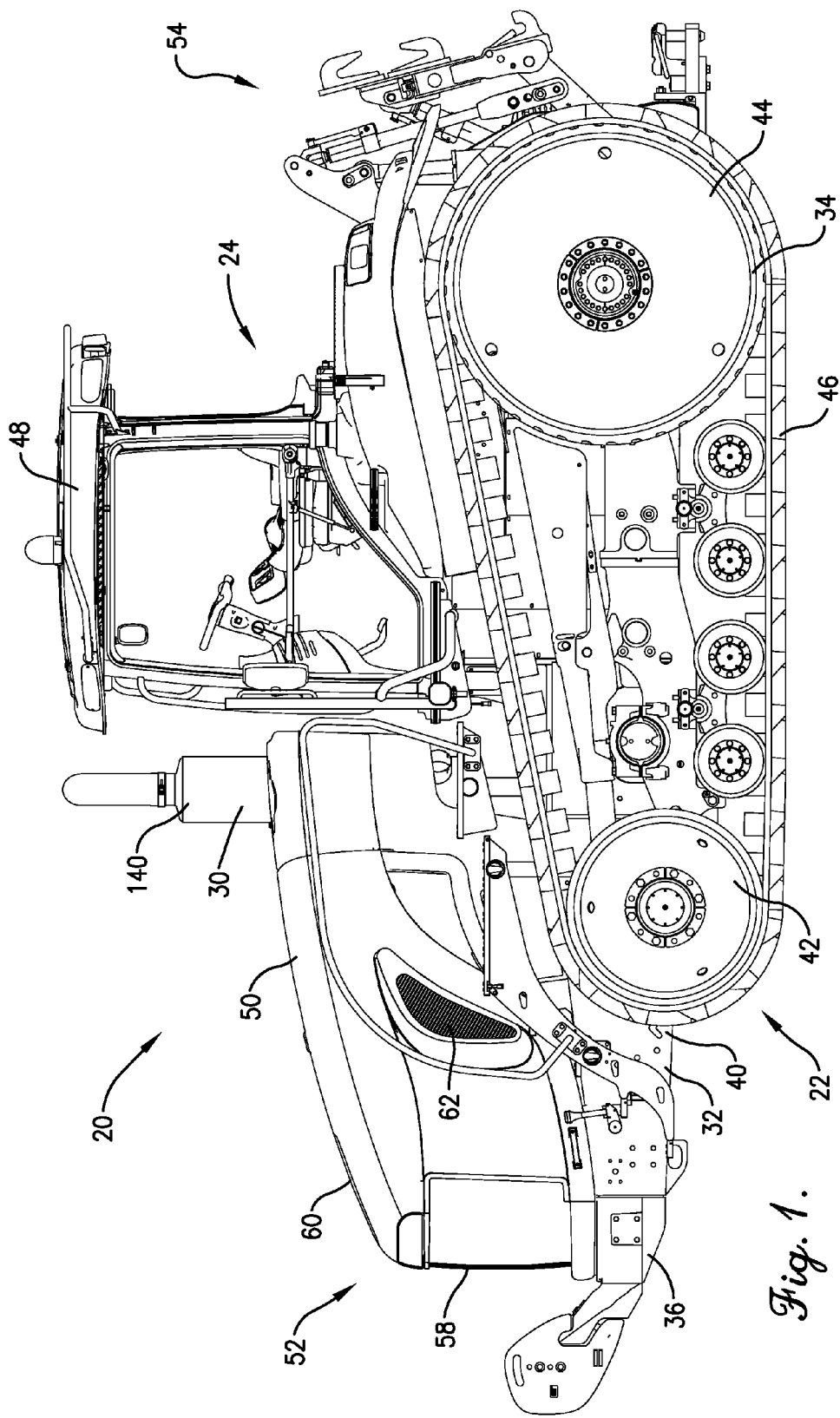
FIG. 1 is a left side elevation of an agricultural off-road tractor constructed in accordance with a preferred embodiment of the present invention, with the illustrated tractor broadly including a rolling chassis, body, diesel engine, vehicle cooling assembly, and engine exhaust assembly.

Turning initially to FIGS. 1-3, a diesel-powered agricultural tractor 20 is designed to operate under Federal emissions standards. In particular, the Environmental Protection Agency (EPA) has promulgated Tier 4 standards requiring substantial reductions in NOx emissions and particulate matter emissions for off-road vehicles. Newly manufactured off-road vehicles, such as the illustrated tractor 20, are required to use emission control technologies, such as diesel oxidation catalysts (DOCs), particulate filters, and NOx adsorbers, to meet the EPA requirements. Furthermore, Tier 4 standards require reduction of sulfur content in non-road diesel fuels to enable the use of emission control technologies. While the illustrated tractor 20 is designed to meet the Tier 4 emissions requirements, the principles of the present invention are also applicable to other off-road vehicles, such as other agricultural or utility vehicles. The illustrated tractor 20 broadly includes a rolling chassis 22, a body 24, diesel engine 26, vehicle cooling assembly 28, and exhaust treatment assembly 30. It is also not necessary for the illustrated vehicle 20 to meet the Tier 4 emissions requirements. For example, the principles of the present invention are equally applicable to vehicles that meet other emissions standards or no standards at all.

The rolling chassis 22 is constructed to support the remainder of the tractor 20. The rolling chassis 22 broadly includes a longitudinal chassis frame 32 and a track unit 34. In the usual manner, the chassis frame 32 extends longitudinally along a vehicle axis, is substantially rigid, and is constructed to resist various forces (e.g., pulling forces, pushing forces, and torsional forces) due to normal use of the tractor 20. The chassis frame 32 includes a forward pan 36, intermediately-spaced towers 38, and frame rails 40 that extend from respective towers 38 forwardly to the pan 36. As will be discussed in greater detail, the chassis frame 32 is configured to support the diesel engine 26 as well as the vehicle cooling assembly 28 and exhaust treatment assembly 30.

The chassis frame 32 also presents outermost sides as well as fore and aft frame ends, with the engine 26, cooling assembly 28, and treatment assembly 30 generally being spaced between the frame sides and being spaced between the fore and aft ends of the frame. The illustrated chassis frame 32 is constructed of conventional carbon steel. However, the principles of the present invention are also applicable where the chassis frame 32 is constructed of other materials or is otherwise shaped or constructed to support the engine 26, cooling assembly 28, and treatment assembly 30.

Each track unit 34 is operably attached to the chassis frame 32 along respective left and right sides of the chassis frame 32. Each track unit 34 is conventional and is drivingly powered by the diesel engine 26. The illustrated track unit 34 broadly includes fore and aft track wheels 42,44 and endless track belt 46 that extends around the corresponding track wheels 42,44. Each aft track wheel 44 is drivingly attached to diesel engine 26 via a transmission (not shown). Thus, the track unit 34 and chassis frame 32 cooperate to provide a rolling platform for the tractor 20. However, the principles of the present invention are equally applicable where the rolling chassis 22 is alternatively constructed, e.g., the tractor 20 could be supported on each side of the chassis frame 32 by individual fore and aft wheels instead of the track unit 34.

Turning again to FIGS. 1-3, the chassis 22 and body 24 cooperatively present fore and aft ends 52,54 of the tractor 20 and extend longitudinally between the ends 52,54 along the vehicle axis. The body 24 is mounted on the rolling chassis 22 and broadly includes a cab 48 and hood 50. The cab 48 is conventional and is mounted between ends 52 and 54. In the usual manner, the cab 48 includes various vehicle controls and serves to house the operator of the tractor 20. The cab 48 is also positioned above the chassis 22, in particular the track unit 34, to provide a clear line of sight to locations around the tractor 20.

The hood 50 is removably mounted to the chassis frame 32 and extends forwardly of the cab 48 to the fore end 52 of the tractor 20. The body 24 and chassis frame 32 cooperatively define an engine compartment 56 that is located beneath the hood 50 (when the hood 50 is installed on the tractor 20) and is configured to receive the diesel engine 26. The illustrated hood 50 and engine compartment 56 are spaced forwardly along the tractor 20 adjacent the fore end 52. However, it is also within the scope of the present invention where the hood 50 and engine compartment 56 are positioned at a different location along the length of the tractor 20. For example, the hood 50 or engine compartment 56 could be located rearwardly along the tractor 20 adjacent the aft end 54, e.g., for a rear-engine off-road vehicle such as a front loader.

The hood 50 is elongated and presents a front-facing front vent 58, a top vent 60 adjacent the front vent 58, and side vents 62 positioned along respective sides of the hood 50. In the usual manner, vents 58,60,62 comprise perforated sections of the hood 50 and permit air flow therethrough. In particular the vents 58,60,62 permit fluid communication between the engine compartment 56 and ambient. Furthermore, the forward pan 36 presents a lower vent 64 spaced adjacent the fore end 52 (see FIG. 5). The lower vent 64 also permits fluid communication between the engine compartment 56 and ambient. In use, fresh air enters the engine compartment 56 via the front vent 58, top vent 60, and lower vent 64 and air exits the engine compartment 56 in a rearward direction from the rear of hood 50 and also to the sides via the side vents 62. As with many off-road vehicles, it is also possible for the hood 50 to provide open side margins so that the engine 26 is generally exposed to ambient along the sides thereof. While the illustrated configuration of vents is preferable, it is also within the scope of the present invention where an alternative placement of vents is used in the hood 50. For example, where the hood 50 is mounted adjacent a rear end of a vehicle and thereby comprises a rear-mounted hood, the vents may be alternatively configured to provide air flow into and out of the engine compartment 56, e.g., by positioning vents along the sides and rear of hood 50.

Turning now to FIGS. 2-8, the diesel engine 26 comprises a conventional six-cylinder engine and is operable to power the tractor 20. In particular, the illustrated engine 26 powers the track unit 34, and provides power associated with hydraulic and electronic controls. The diesel engine 26 broadly includes an engine block 66, cylinder head 68, cylinders (not shown), intake manifold (not shown), exhaust manifold 70, and a turbocharger 72. The turbocharger 72 is also conventional and includes a compressor 74 and a turbine 76. In the usual manner, the turbine 76 is powered by engine exhaust and is drivingly attached to the compressor 74 by a shaft (not shown). The compressor 74 presents a compressor intake 78 and a compressor discharge 80, with the compressor intake 78 communicating with an air intake system (not shown). The compressor 74 receives air from the air intake system and discharges compressed air through the discharge 80 and into the intake manifold via the charge air cooler, as discussed below.

Turning to FIGS. 5-8, the turbine presents a turbine intake 82 and a turbine discharge 84. The turbine intake is fluidly attached to the exhaust manifold 70. Thus, exhaust from the engine 26 travels through manifold runners 86 of the exhaust manifold 70 and through a manifold outlet 88 and is received by the turbine intake 82 (see FIGS. 7 and 8). As will be discussed in greater detail, the exhaust discharged from turbine 76 is treated by the exhaust treatment assembly 30. While the illustrated engine 26 includes the turbocharger 72, it is also within the scope of the present invention where the engine 26 is naturally aspirated. Furthermore, it is also within the ambit of the present invention where the tractor 20 is powered by a gasoline engine instead of the illustrated diesel engine 26. Again, the diesel engine 26 is drivingly attached to the track unit 34 via a transmission (not shown) to power the tractor 20.

Turning again to FIGS. 2-6, the vehicle cooling assembly 28 serves to cool the engine 26 and other components of tractor 20. As will be discussed further, the vehicle cooling assembly 28 also houses part of the exhaust treatment assembly 30. The vehicle cooling assembly 28 broadly includes an enclosure 90 and a powered fan 92 operable to vent the enclosure 90. The enclosure 90 is substantially rigid and presents spaced apart fore and aft margins 94,96, spaced apart top and bottom margins 98,100, and spaced apart side margins 102. The enclosure 90 includes a pair of side walls 104 that each include a frame 106 and a door 108 pivotally mounted on the frame 106. The illustrated side walls 104 present respective ones of the side margins 102 and extend substantially parallel to one another to interconnect multiple heat exchangers of the enclosure 90.

The heat exchangers of the enclosure 90 include an engine radiator 110 and an oil cooler 112. The engine radiator 110 fluidly communicates with the engine 26 via coolant lines (not shown) and serves to release heat from coolant flowing through the engine 26. The oil cooler 112 fluidly communicates with a source of oil (e.g., a transmission or hydraulic system) via oil lines (not shown) and removes heat from the oil transmitted to the oil cooler 112. The engine radiator 110 and oil cooler 112 are both spaced forwardly to cooperatively present the fore margin 94 (see FIGS. 5 and 6). However, it is also within the ambit of the present invention where the radiator 110 and oil cooler 112 define (collectively or individually) another one of the margins, multiple margins, or only part of one of the margins.

The heat exchangers of the enclosure 90 also include a charge air cooler 114, a fuel cooler 116, and an air conditioner condenser 118. The charge air cooler 114 is positioned in the compressed intake air stream flowing from the compressor discharge 80 to the intake manifold of the diesel engine 26, and serves to cool the compressed intake air stream. The fuel cooler 116 is fluidly connected to the fuel return line of a fuel system to remove heat from the fuel system as excess fuel returns from the diesel engine 26 to the fuel tank (not shown). The condenser 118 is fluidly connected to an evaporator (not shown) of an air conditioner system (not shown) and serves to remove heat from the air conditioner system. The charge air cooler 114, fuel cooler 116, and air conditioner condenser 118 are positioned toward an upper most end of the enclosure 90 to cooperatively present the top margin 98 (see FIGS. 2 and 5). Thus, the heat exchangers extend laterally to interconnect the side walls 104 and serve to present air inlets 120 of the enclosure 90, as will be discussed in greater detail. It is also within the ambit of the present invention where the charge air cooler 114, fuel cooler 116, and air conditioner condenser 118 define (collectively or individually) another one of the margins, multiple margins, or only part of one of the margins.

Turning again to FIGS. 2-6, the enclosure 90 also includes a fan shroud 122 that presents an air outlet opening 124. In the illustrated embodiment, the fan shroud 122 is positioned rearwardly to present the aft margin 96. Furthermore, margins 94,96, margins 98,100, and margins 102 are each spaced apart to present an airflow plenum 126, with the plenum 126 being enclosed by the margins 94,96,98,100,102. The inlets 120 and outlet 124 permit fluid communication between the plenum 126 and ambient. While the illustrated enclosure 90 of the present invention is preferred, it is also within the present invention where the enclosure 90 is alternatively configured. For example, the enclosure 90 could include an alternative number or configuration of heat exchangers for cooling the tractor 20, e.g., the enclosure 90 could include a heat exchanger in place of a side wall 104 to present a corresponding side margin 102. Details of another preferred embodiment of an enclosure with multiple heat exchangers are disclosed in U.S. Pat. No. 7,128,178, issued Oct. 31, 2006, and entitled VEHICLE COOLING RADIATOR ARRANGEMENT, which is hereby incorporated in its entirety by reference herein.

The enclosure 90 is preferably mounted to the forward pan 36 of the chassis frame 32 adjacent the fore end 52 and in front of the engine 26. The forward pan 36 includes a U-shaped side rail 128 with front and side rail sections and a bottom wall 130 that spans the side rail sections along a lower margin of the side rail 128. The side rail 128 and bottom wall 130 cooperatively present an open space 132 that extends vertically from an open top 134 of the pan 36 to the bottom wall 130, with the lower vent 64 fluidly communicating with and positioned adjacent a forward end of the open space 132.

The enclosure 90 is mounted by positioning the bottom margin 100 within the open space 132 adjacent the bottom wall 130, with the enclosure 90 extending upwardly out of the open space 132 adjacent the fore end 52 of the tractor 20 to receive an uninterrupted stream of ambient air (i.e., the air stream is not interrupted by other components of the tractor 20, except for the corresponding vents of the hood 50) when the tractor 20 is stationary or traveling over the ground. The enclosure 90 is also positioned so that the engine radiator 110 and oil cooler 112 are both spaced forwardly relative to the length of the tractor 20 and face forwardly to receive the uninterrupted ambient air stream via the front vent 58, as will be discussed. For some aspects of the present invention, the enclosure 90 could be alternatively mounted on the frame 32 without departing from the scope of the present invention. For example, the enclosure 90 could be mounted to one side of or rearwardly of the engine 26. Also, the enclosure 90 could be positioned so that the engine radiator 110 faces in a direction other than the forward direction. For example, the engine radiator 110 could be positioned along a rear margin of the enclosure 90 to face in a rearward direction.

The enclosure 90 is also positioned so that the inlet 120 presented by the radiator 110 and oil cooler 112 is adjacent to front vent 58, and inlet 120 presented by the charge air cooler 114, fuel cooler 116, and condenser 118 is adjacent to top vent 60. Thus, the uninterrupted stream of ambient air can flow into the plenum 126 by passing through both the front and top vents 58,60 and then through corresponding inlets 120. The outlet opening 124 is also positioned adjacent to side vents 62 so that heated air within the plenum 126 can be drawn by the powered fan 92 through the outlet opening 124 and then blown outwardly through the side vents 62 in a rearward direction and rearwardly from a rear end of the engine compartment 56. In this manner, the illustrated positioning of the enclosure 90 within the hood 50 and the configuration of vents 58,60,62 adjacent the enclosure 90 permits ambient air to pass through and be heated by the vehicle cooling assembly 28, and the heated air is discharged rearwardly so that the heated air is restricted from re-entering the plenum 126. Thus, the vehicle cooling assembly 28 is operable to efficiently cool components of the tractor 20.

The powered fan 92 is conventional and includes a plurality of circumferentially spaced fan blades. The powered fan 92 is preferably mounted on a drive shaft 136 drivingly attached to the diesel engine 26 and is powered by the diesel engine 26. However, it is also within the scope of the present invention where the fan is powered by another motor, such as a hydraulic motor. In the usual manner, the powered fan 92 is positioned to rotate within the outlet opening 124. In the illustrated embodiment, the fan 92 rotates to draw air through the inlets 120 and then through the air flow plenum 126, with heated air being drawn through the outlet opening 124. The side walls 104 and bottom wall 130 serve to direct the air stream from the inlets 120 along path(s) through the plenum 126 and to the outlet opening 124. Thus, the powered fan 92 draws air along the path(s) extending between each inlet 120 and the outlet opening 124. However, the principles of the present invention are equally applicable where the fan is positioned in an inlet of the enclosure 90 and is configured to push air through the air flow plenum 126 and then through the openings presented by the heat exchangers. Also, while the fan 92 is preferably positioned adjacent the aft margin 96, it is also within the ambit of the present invention where the powered fan 92 is mounted adjacent another margin of the enclosure 90.

Turning to FIGS. 2-8, the exhaust treatment assembly 30 receives engine exhaust from the diesel engine 26, treats the exhaust, and discharges the treated exhaust to ambient. The exhaust treatment assembly 30 includes an exhaust treatment device 138 and an exhaust muffler 140. The exhaust muffler 140 comprises a conventional cylindrical muffler and includes a muffler intake 142 positioned adjacent a lower end of the muffler 140 and a muffler discharge 144 positioned adjacent an upper end of the muffler 140. However, the exhaust muffler 140 could be alternatively configured or constructed to provide suitable exhaust noise reduction consistent with the scope of the present invention. The illustrated exhaust muffler 140 is supported on the chassis frame 32 by mounting the lower end of the muffler 140 on a right one of the towers 38. However, the exhaust muffler 140 could be alternatively positioned or supported on the chassis frame 32.

The illustrated exhaust treatment device 138 comprises a diesel particulate filter (DPF) that is operable to treat diesel engine exhaust by removing particulate matter. However, the principles of the present invention are also applicable where the exhaust treatment device 138 includes another type of treatment device, such as a selective catalytic reduction (SCR) filter for removing $NO_X$, an exhaust noise muffler, or a combination of treatment elements. While the illustrated assembly 30 preferably includes a single exhaust treatment device 138, it is also within the scope of the present invention where the assembly 30 includes multiple treatment devices.

The illustrated exhaust treatment device 138 includes a pair of cylindrical treatment cannisters 146 that each preferably include a DPF element (not shown). However, it is also within the scope of the present invention where the cannisters 146 include different treatment elements, e.g., one cannister 146 including a DPF element and another cannister 146 including an SCR element. The illustrated cannisters 146 preferably present an outermost diameter D1 in the range of about four (4) inches to about twenty-four (24) inches, more preferably about ten (10) inches to about sixteen (16) inches, and most preferably about thirteen (13) inches (see FIG. 6). However, the cannisters 146 could present a different size or shape as a function of various requirements, such as efficiency or horsepower. For example, the cross-sectional shape of the cannisters 146 could be oblong instead of circular to improve air flow across the exhaust treatment device 138.

The illustrated device 138 is also preferably constructed so that the pair of cannisters 146 are arranged with their longitudinal axes A being parallel, with the cannisters 146 being spaced apart from each other. More preferably, the cannisters 146 are positioned with a dimension D2 between the axes A being in the range of about ten (10) inches to about thirty (30) inches, and most preferably the dimension D2 is about twenty (20) inches (see FIG. 5). For some aspects of the present invention, the exhaust treatment device 138 could also include an alternative number of cannisters 146.

The illustrated cannisters 146 are positioned side-by-side and are structurally interconnected by a pair of oppositely spaced left and right end caps 148,150. The end caps 148,150 present respective treatment intake and discharge ports 152, 154 of the exhaust treatment device 138. The end caps 148, 150 also present internal fluid passages (not shown) that fluidly connect the cannisters 146 and permit simultaneous exhaust flow through both cannisters 146, i.e., parallel exhaust treatment flow. However, it is consistent with the scope of the present invention where the cannisters 146 are fluidly connected in series with one another so that the entire exhaust flow must pass through both cannisters 146, e.g., where each of the cannisters 146 included a different treatment element.

The exhaust treatment device 138 also includes a cylindrical exhaust intake line 156 attached to the intake port 152 presented by the left end cap 148. The exhaust treatment device 138 further includes a regeneration head 158 attached to an inlet end of the intake line 156 opposite the intake port 152 of the left end cap 148. The regeneration head 158 is attached to an air line 160, a fuel line (not shown), and an electrical spark line (not shown) so that, in the usual manner, the regeneration head 158 is operable to cause combustion of an air-fuel mixture within the cannisters 146 for regeneration of the DPF element. Regeneration involves the removal of excessive amounts of particulate matter in the DPF element. Particulate matter is removed from the DPF element by supplying the air-fuel mixture to the head 158 and combusting the mixture and the particulate matter within the cannisters 146. The combustion process produces a residual ash in the device 138, and during periodic maintenance the device 138 is cleaned to remove the ash. Preferably, the regeneration head 158 is positioned adjacent the diesel engine 26 to permit convenient connection of the head 158 to the engine fuel supply and engine electrical system (as a source of high voltage electricity for electrical spark). As will be discussed further, the exhaust treatment device 138 is positioned within the air flow plenum 126.

Turning to FIGS. 7 and 8, the exhaust treatment assembly 30 also includes a pair of conventional exhaust lines 162,164 that fluidly connect the diesel engine 26, exhaust treatment device 138, and the exhaust muffler 140. Exhaust line 162 is attached at one end to the turbine discharge 84 of the turbocharger 72 and at the other end to the inlet end of the intake runner 152. Thus, exhaust line 162 receives an untreated exhaust flow from the turbocharger turbine 72 and directs the untreated exhaust flow to the exhaust treatment device 138. Exhaust line 164 is attached at one end to the discharge port 154 of the exhaust treatment device 138 and at the other end to the muffler intake 142. Thus, the exhaust line 164 supplies treated engine exhaust from the exhaust treatment device 138 to the exhaust muffler 140. While the illustrated exhaust treatment assembly 30 preferably includes the exhaust treatment device 138 and exhaust muffler 140 fluidly interconnected to reduce noise and exhaust emissions, it is also within the ambit of the present invention where the assembly 30 includes other systems to treat or utilize the exhaust stream, such as a system for exhaust gas recirculation. Additionally, the exhaust treatment assembly 30 could be devoid of muffler 140 (e.g., where the assembly 30 has no muffler or where the exhaust treatment device 138 includes a muffler element).

Turning again to FIGS. 2-8, the exhaust treatment device 138 is positioned within the air flow plenum 126. The illustrated device 138 is preferably positioned so that the longitudinal axis A of each of the cannisters 146 extends laterally and parallel to the other axis A, with one cannister 146 being spaced apart from and positioned on top of the other cannister 146. In this manner, air flow coming through the air inlet 120 presented by the engine radiator 110 and oil cooler 112 flows substantially uniformly across both of the cannisters 146.

Furthermore, the exhaust treatment device 138 is preferably positioned entirely within the enclosure 90 and is generally spaced from the margins of the enclosure 90. However, for some aspects of the present invention, the device 138 may be partly positioned within the enclosure 90. Preferably, the cannisters 146 are spaced from the enclosure 90 in a fore-and-aft direction to present an upstream space between the cannisters 146 and a rearmost margin of the inlet 120 presented cooperatively by the radiator 110 and oil cooler 112 and a downstream space between the cannisters 146 and the outlet opening 124.

The upstream space results from the combination of the cannister diameter and the position of the cannisters 146 at an upstream dimension D3. The upstream dimension D3 is the distance from the cannister axis A to the rearmost margin of the inlet 120 presented cooperatively by the radiator 110 and oil cooler 112 (see FIG. 5). The upstream dimension D3 preferably ranges from about five (5) inches to about twenty (20) inches, and more preferably is about eleven (11) inches. The downstream space results from the combination of the cannister diameter and the position of the cannisters 146 at a downstream dimension D4 measured from the cannister axis A to the outlet opening 124 (see FIGS. 5 and 6). The downstream dimension D4 preferably ranges from about ten (10) inches to about thirty (30) inches, and more preferably is about twenty-one (21) inches.

The illustrated cannisters 146 are also preferably spaced along the fore-and-aft direction so that the upstream space is less than the downstream space. In this manner, the device 138 is positioned to permit efficient air flow through the plenum 126. However, for some aspects of the present invention, the cannisters 146 could be alternatively positioned relative to the enclosure 90.

While ambient air enters via the air inlet 120 presented by the engine radiator 110 and oil cooler 112, ambient air also enters the enclosure 90 via the air inlet 120 presented by the charge air cooler 114, fuel cooler 116, and condenser 118 and flows across the cannisters 146. The cannisters 146 are also preferably spaced from the charge air cooler 114, fuel cooler 116, and condenser 118. It is also within the ambit of the present invention where another one or more air inlets are presented along the side margin 102 or bottom margin 100 of the enclosure 90.

It has been determined that the illustrated position of the device 138 within the enclosure 90 results in a number of benefits. For example, the illustrated configuration of the enclosure 90 and powered fan 92 guides fresh ambient air into the plenum 126 and restricts heated air from re-entering the plenum 126. It has also been found that the illustrated enclosure 90 is configured to improve the efficiency of the incorporated heat exchangers by minimizing thermal stacking effects. Thermal stacking occurs when multiple heat exchangers are installed next to each other and the heat received by one heat exchanger from adjacent heat exchangers reduces the cooling efficiency of that one heat exchanger. By exposing the illustrated device 138 to the high velocity air flow generated within the plenum 126 and minimizing thermal stacking effects, the operating temperatures of various components of the device 138 (such as the regeneration head 158) are lowered below the temperature of the exhaust flow, and the operational life of the device 138 is thereby lengthened.

It has also been found that the illustrated position of the device 138 within the enclosure 90 serves to restrict collection of foreign debris onto the device 138. In particular, the enclosure 90 restricts debris from entering the plenum 126. Also, the high velocity air flow generated within the plenum 126 restricts any debris within the plenum 126 from coming to rest on the device 138. Yet further, the position of the device 138 adjacent to and forward of the diesel engine 26 enables the device 138 to be conveniently connected to a source of diesel fuel and spark ignition for regeneration of the diesel particulate filter.

In operation, the diesel engine 26 powers the tractor 20, with exhaust generated by the diesel engine 26 flowing through the turbine 76 to power the turbocharger 72 and then being discharged into the exhaust treatment assembly 30. The exhaust flow becomes separated into streams that flow through and are treated in corresponding cannisters 146. The treated exhaust streams meet to flow into the exhaust muffler 140 and then into ambient. At the same time, the powered fan 92 is spun by the engine 26 and draws air through the air inlets 120 and along multiple paths from the inlets 120 to the outlet 124, with air flowing across the device 138 positioned within the air flow plenum 126.

Periodically, the exhaust treatment device 138 requires maintenance to remove excessive amounts of particulate matter. The particulate matter is removed from the exhaust treatment device 138 by activating the regeneration head 158. In particular, a mixture of fuel and air is supplied to the head 158 and combusted within the cannisters 146 along with the particulate matter. Residual ash from combustion is occasionally removed from the exhaust treatment device 138.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A self-propelled low-emission off-road vehicle having an engine compartment in which an internal combustion engine operable to propel the vehicle is located, said off-road vehicle comprising:

a vehicle cooling assembly positioned within the engine compartment and including an enclosure and a powered fan operable to vent the enclosure, with the enclosure and fan configured so that the engine is positioned outside of the enclosure, said enclosure including opposite spaced apart fore and aft margins, spaced apart side margins, and spaced apart top and bottom margins extending in a fore-and-aft direction between the fore and aft margins, said enclosure presenting an air inlet and an air outlet located along respective margins, and an air flow plenum enclosed by the margins, with the inlet and outlet permitting fluid communication between the air flow plenum and ambient, said powered fan being positioned in a first one of the inlet and outlet and operable to direct a stream of air along a path between the inlet and outlet, said enclosure including a heat exchanger operable to discharge heat produced by the vehicle, said heat exchanger at least partly defining one or more of the margins and presenting a second one of the inlet and outlet; and an engine exhaust assembly operable to carry engine exhaust gas from the engine to ambient, said engine exhaust assembly including an exhaust treatment device that receives engine exhaust gas and discharges treated exhaust gas, said exhaust treatment device being positioned at least partly in the air flow plenum and positioned fluidly in the path between the inlet and outlet, with the air stream flowing along the exhaust treatment device to remove heat therefrom.

2. The self-propelled low-emission off-road vehicle as claimed in claim 1, said enclosure including another heat exchanger operable to discharge heat produced by the vehicle, said heat exchangers at least partly defining respective margins of the enclosure.

3. The self-propelled low-emission off-road vehicle as claimed in claim 2, said first-mentioned heat exchanger presenting the inlet and said another heat exchanger presenting another inlet, said powered fan being positioned within the outlet to draw the air stream through the inlets and into the air flow plenum.

4. The self-propelled low-emission off-road vehicle as claimed in claim 2, said first-mentioned heat exchanger at least partly defining the fore margin, said another heat exchanger at least partly defining the top margin.

5. The self-propelled low-emission off-road vehicle as claimed in claim 4, said powered fan being positioned adjacent the aft margin, said enclosure including a fan shroud at least partly defining the aft margin and presenting the outlet.

6. The self-propelled low-emission off-road vehicle as claimed in claim 5, said enclosure including walls defining the side margins and configured to direct the air stream along the path from at least one of the inlets to the outlet.

7. The self-propelled low-emission off-road vehicle as claimed in claim 1, said powered fan operable to be drivingly coupled to and powered by the internal combustion engine, said heat exchanger presenting the inlet and said powered fan being positioned within the outlet to draw the air stream through the inlet and into the air flow plenum.

8. The self-propelled low-emission off-road vehicle as claimed in claim 7; and a longitudinally extending vehicle frame supporting the vehicle cooling assembly and operable to support the internal combustion engine, said enclosure mounted forwardly of the engine to receive ambient air.

9. The self-propelled low-emission off-road vehicle as claimed in claim 8, said enclosure being mounted on the frame with the heat exchanger at least partly defining the fore margin.

10. The self-propelled low-emission off-road vehicle as claimed in claim 9, said powered fan being positioned adjacent the aft margin, said enclosure including a fan shroud at least partly defining the aft margin and presenting the outlet.

11. The self-propelled low-emission off-road vehicle as claimed in claim 10, said enclosure including walls defining the side margins and configured to direct the air stream along the path from at least one of the inlets to the outlet.

12. The self-propelled low-emission off-road vehicle as claimed in claim 10, said exhaust treatment device being spaced longitudinally between the heat exchanger and the powered fan.

13. The self-propelled low-emission off-road vehicle as claimed in claim 7, said heat exchanger comprising an engine radiator operable to discharge heat from the engine.

14. The self-propelled low-emission off-road vehicle as claimed in claim 13, said vehicle cooling assembly including another heat exchanger presenting another air inlet of the enclosure.

15. The self-propelled low-emission off-road vehicle as claimed in claim 14, said another heat exchanger being selected from the group consisting of a charge air cooler, a condenser, a fuel cooler, an oil cooler, and combinations thereof.

16. The self-propelled low-emission off-road vehicle as claimed in claim 1, said exhaust treatment device including a cylindrical housing section, said housing section presenting a housing axis extending transversely to the path.

17. The self-propelled low-emission off-road vehicle as claimed in claim 16, said exhaust treatment device including another cylindrical housing section, with one section being spaced below the other section, said another cylindrical housing section presenting another housing axis parallel to the first-mentioned housing axis.

18. The self-propelled low-emission off-road vehicle as claimed in claim 1, said exhaust treatment device including a diesel particulate filter; and a longitudinally extending vehicle frame supporting the vehicle cooling assembly and exhaust treatment device and operable to support the internal combustion engine, said diesel particulate filter spaced forwardly of the internal combustion engine.

19. The self-propelled low-emission off-road vehicle as claimed in claim 18, said powered fan operable to be drivingly coupled to and powered by the internal combustion engine, said heat exchanger presenting the inlet and said powered fan being positioned within the outlet to draw the air stream through the inlet and into the air flow plenum.

* * * * *